US012134101B2

(12) United States Patent
Piramoon

(10) Patent No.: US 12,134,101 B2
(45) Date of Patent: Nov. 5, 2024

(54) FIXED ANGLE CENTRIFUGE ROTOR WITH TUBULAR CAVITIES AND RELATED METHODS

(71) Applicant: Fiberlite Centrifuge LLC, Santa Clara, CA (US)

(72) Inventor: Sina Piramoon, San Jose, CA (US)

(73) Assignee: Fiberlite Centrifuge LLC, Santa Clara, CA (US)

( * ) Notice: Subject to any disclaimer, the term of this patent is extended or adjusted under 35 U.S.C. 154(b) by 981 days.

(21) Appl. No.: 16/826,971

(22) Filed: Mar. 23, 2020

(65) Prior Publication Data

US 2020/0306769 A1 Oct. 1, 2020

Related U.S. Application Data

(60) Provisional application No. 62/826,104, filed on Mar. 29, 2019.

(51) Int. Cl.
*B04B 5/04* (2006.01)
*B04B 7/02* (2006.01)
*B04B 7/08* (2006.01)

(52) U.S. Cl.
CPC .............. *B04B 5/0414* (2013.01); *B04B 7/02* (2013.01); *B04B 7/085* (2013.01); *B04B 2007/025* (2013.01)

(58) Field of Classification Search
CPC ......... B04B 7/06; B04B 5/0414; B04B 7/085; B04B 2007/025; B04B 7/02
USPC ........................................................... 494/16
See application file for complete search history.

(56) References Cited

U.S. PATENT DOCUMENTS 4,468,269 A * 8/1984 Carey ..................... B04B 7/085 156/181
4,738,656 A 4/1988 Piramoon et al.
4,781,669 A 11/1988 Piramoon
4,790,808 A 12/1988 Piramoon
4,824,429 A * 4/1989 Keunen ................... B04B 7/085 494/81
4,991,462 A * 2/1991 Breslich, Jr. .......... B04B 5/0414 74/572.4

(Continued)

FOREIGN PATENT DOCUMENTS

CN 1098666 A 2/1995
CN 1820855 A 8/2006

(Continued)

OTHER PUBLICATIONS

European Patent Office, International Search Report and Written Opinion of the International Searching Authority, International Application No. PCT/US2020/025232, mailed Jun. 19, 2020 (16 pages).

(Continued)

*Primary Examiner* — Charles Cooley
(74) *Attorney, Agent, or Firm* — BakerHostetler

(57) ABSTRACT

A fixed angle centrifuge rotor is provided including a rotor body having an upper surface and a plurality of tubular cavities extending from the upper surface to respective bottom walls. A pressure plate is operatively coupled to the bottom walls of the tubular cavities and is configured to transfer torque to the bottom walls. The pressure plate is configured to be directly coupled to a rotor hub and to receive torque directly from the rotor hub.

31 Claims, 8 Drawing Sheets

(56) References Cited

U.S. PATENT DOCUMENTS

| | | | | | |
|---|---|---|---|---|---|
| 5,057,071 | A * | 10/1991 | Piramoon | B23P 11/025 494/81 |
| 5,362,300 | A | 11/1994 | Christensen | |
| 5,362,301 | A * | 11/1994 | Malekmadani | B04B 7/085 494/81 |
| 5,382,219 | A * | 1/1995 | Malekmadani | B04B 7/085 494/81 |
| 5,505,684 | A * | 4/1996 | Piramoon | H02K 7/14 210/512.1 |
| 5,562,582 | A * | 10/1996 | Malekmadani | B04B 5/0414 74/572.4 |
| 5,601,522 | A * | 2/1997 | Piramoon | B04B 7/085 29/889 |
| 5,643,168 | A * | 7/1997 | Piramoon | B04B 7/085 494/81 |
| 5,759,592 | A * | 6/1998 | Piramoon | B04B 7/085 249/177 |
| 5,776,400 | A * | 7/1998 | Piramoon | B29C 33/76 264/258 |
| 5,833,908 | A | 11/1998 | Piramoon et al. | |
| 5,876,322 | A * | 3/1999 | Piramoon | B29C 70/222 494/81 |
| 6,056,910 | A | 5/2000 | Fritsch et al. | |
| 6,296,798 | B1 | 10/2001 | Piramoon | |
| 7,371,206 | B2 | 5/2008 | Eigemeier et al. | |
| 7,938,627 | B2 * | 5/2011 | Muller | F04D 29/023 416/198 A |
| 8,147,392 | B2 * | 4/2012 | Piramoon | B04B 7/085 494/81 |
| 8,273,202 | B2 * | 9/2012 | Piramoon | B04B 5/0414 156/172 |
| 8,323,169 | B2 * | 12/2012 | Piramoon | B04B 5/0414 156/185 |
| 9,352,337 | B2 * | 5/2016 | Lee | B04B 7/085 |
| 10,086,383 | B2 * | 10/2018 | Piramoon | B04B 7/06 |
| 10,272,446 | B2 * | 4/2019 | Piramoon | B04B 7/06 |
| 10,434,522 | B2 * | 10/2019 | Piramoon | B04B 7/085 |
| 2010/0018344 | A1 * | 1/2010 | Spears | H02K 7/025 74/572.12 |
| 2010/0216622 | A1 * | 8/2010 | Piramoon | B04B 7/085 156/185 |
| 2011/0111942 | A1 * | 5/2011 | Piramoon | B04B 5/0414 29/458 |
| 2012/0186731 | A1 * | 7/2012 | Piramoon | B04B 5/0414 242/433 |
| 2016/0193614 | A1 * | 7/2016 | Piramoon | B04B 5/0414 494/60 |
| 2023/0072076 | A1 * | 3/2023 | Piramoon | B04B 9/14 |
| 2023/0294112 | A1 * | 9/2023 | Piramoon | B04B 7/02 494/12 |
| 2023/0415168 | A1 * | 12/2023 | Piramoon | B04B 7/08 |

FOREIGN PATENT DOCUMENTS

| | | | |
|---|---|---|---|
| CN | 102665922 | A | 9/2012 |
| CN | 207899608 | U | 9/2018 |
| JP | S61106351 | U | 7/1986 |
| JP | 2013-510711 | A | 3/2013 |
| JP | 2018-65126 | A | 4/2018 |

OTHER PUBLICATIONS

The International Bureau of WIPO, International Preliminary Report on Patentability, International Application No. PCT/US2020/025232, mailed Oct. 14, 2021 (11 pages).

* cited by examiner

FIXED ANGLE CENTRIFUGE ROTOR WITH TUBULAR CAVITIES AND RELATED METHODS

CROSS-REFERENCE TO RELATED APPLICATION

The present application claims the filing benefit of U.S. Provisional Application Ser. No. 62/826,104, filed Mar. 29, 2019, the disclosure of which is incorporated herein by reference in its entirety.

FIELD OF THE INVENTION

This invention relates generally to centrifuge rotors and, more particularly, to a fixed-angle rotor for use with a centrifuge.

BACKGROUND OF THE INVENTION

Centrifuge rotors are typically used in laboratory centrifuges to hold samples during centrifugation. While centrifuge rotors may vary significantly in construction and in size, one common rotor structure is the fixed angle rotor having a solid rotor body with a plurality of cell hole cavities distributed radially within the rotor body and arranged symmetrically about an axis of rotation. Samples are placed in the cavities, allowing a plurality of samples to be subjected to centrifugation.

Conventional fixed angle centrifuge rotors may be made from metal or various other materials. However, a known improvement is to construct a centrifuge rotor by a compression molding and filament winding process wherein the rotor is fabricated from a suitable material such as composite carbon fiber. For example, a fixed angle centrifuge rotor may be compression molded from layers of resin-coated carbon fiber laminate material. Examples of composite centrifuge rotors are described in U.S. Pat. No. 8,323,169, the disclosure of which is expressly incorporated herein by reference in its entirety.

Because centrifuge rotors are commonly used in high rotation applications where the speed of the centrifuges may exceed hundreds or even thousands of rotations per minute, the centrifuge rotors must be able to withstand the stresses and strains experienced during the high speed rotation of the loaded rotor. During centrifugation, a rotor with samples loaded into the cavities experiences high forces along directions radially outwardly from the cavities and in directions along the longitudinal axes of the cavities, consistent with the centrifugal forces exerted on the sample containers. These forces cause significant stress and strain on the rotor body.

A centrifuge rotor should be able to withstand the forces associated with rapid centrifugation over the life of the rotor. Manufacturers continuously strive to develop centrifuge rotors that provide improved performance in consideration of the dynamic loads experienced during centrifugation, and which address these and other problems associated with conventional rotors.

SUMMARY OF THE INVENTION

The present invention overcomes the foregoing and other shortcomings and drawbacks of fixed angle centrifuge rotors heretofore known. While the invention will be described in connection with certain embodiments, it will be understood that the invention is not limited to these embodiments. On the contrary, the invention includes all alternatives, modifications, and equivalents as may be included within the spirit and scope of the invention.

According to one embodiment, a fixed angle centrifuge rotor is provided including a rotor body having an upper surface and a plurality of tubular cavities extending from the upper surface to respective bottom walls, with each cavity being configured to receive a sample container therein.

The exemplary fixed angle of the centrifuge rotor also includes a pressure plate operatively coupled to the bottom walls of the plurality of tubular cavities that is configured to transfer torque to the bottom walls. The pressure plate is configured to be directly coupled to a rotor hub and receive torque directly from the rotor hub according to one embodiment.

In an exemplary embodiment, the pressure plate includes an upper surface and plurality of depressions spaced apart from each other on the upper surface and each including a bottom surface. The bottom surfaces of the plurality of depressions may fully envelope and engage the bottom walls of the respective tubular cavities.

The pressure plate may include a lower surface and a plurality of bores spaced apart from each other on the lower surface. The bores are each configured to receive a respective pin for directly coupling the pressure plate to the rotor hub.

The pressure plate may include a central bore that is configured to receive a shaft portion of the rotor hub. In one embodiment, the central bore is tapered. The pressure plate may include an external side surface, wherein the external side surface is also tapered.

In an exemplary embodiment, the fixed angle centrifuge rotor includes a first elongate reinforcement extending around at least one exterior surface of the rotor body and at least one exterior surface of the pressure plate along a first path, and a second elongate reinforcement extending around an exterior surface of the first elongate reinforcement along a second path. In one embodiment, the first path may be circular, and the second path may be helical.

The fixed angle centrifuge rotor of the exemplary embodiment may include a lid having a planar lower surface. The rotor body may include a planar upper surface that engages the planar lower surface of the lid. At least one of the planar lower surface of the lid or the planar upper surface of the rotor body may include a pair of annular grooves that are configured to receive a pair of O-rings.

According to one embodiment, the fixed angle centrifuge rotor may include a pressure ring that extends around an exterior surface of the rotor body and is press-fitted to the rotor body. The first elongate reinforcement may extend around at least one exterior surface of the rotor body and at least one exterior surface of the pressure ring along the first path. The second elongate reinforcement may extend around an exterior surface of the first elongate reinforcement along the second path. In one embodiment, the first path may be circular and the second path may be helical.

A method of manufacturing a fixed angle centrifuge rotor according to one embodiment includes the steps of providing a rotor body including a plurality of tubular cavities, with each cavity being configured to receive a sample container therein. The exemplary method further includes the steps of positioning a plurality of cell cups within the plurality of cavities, with each of the cell cups being received within a respective one of the cavities.

The exemplary method further includes the steps of providing a pressure plate, positioning the rotor body over the pressure plate, positioning a pressure ring over the rotor body, applying a first reinforcement to at least the rotor body and the pressure plate, and applying a second reinforcement to at least the pressure plate and the first reinforcement.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
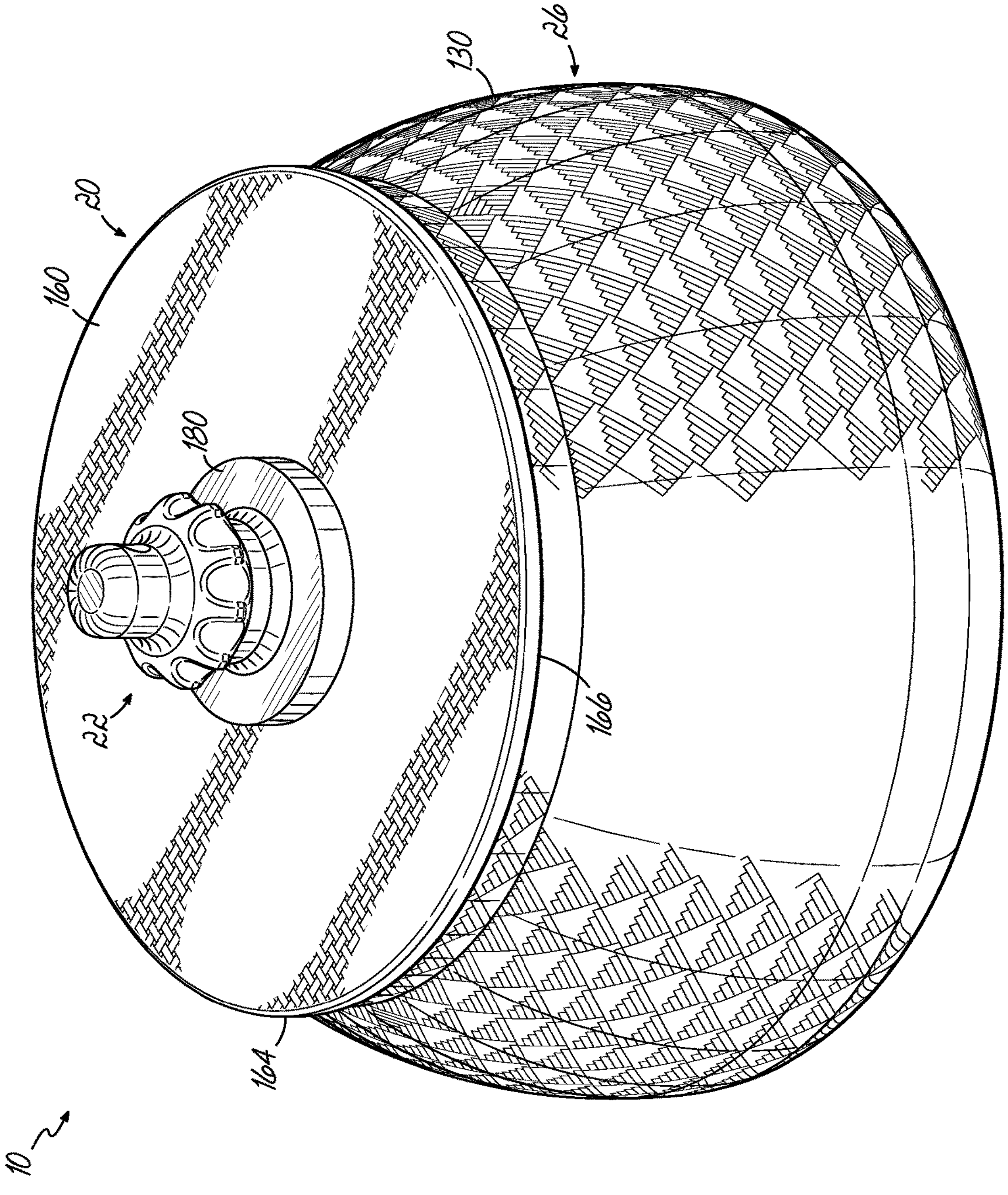
FIG. 1 is a perspective view of a centrifuge rotor in accordance with one embodiment of the present invention.
Figure 2:
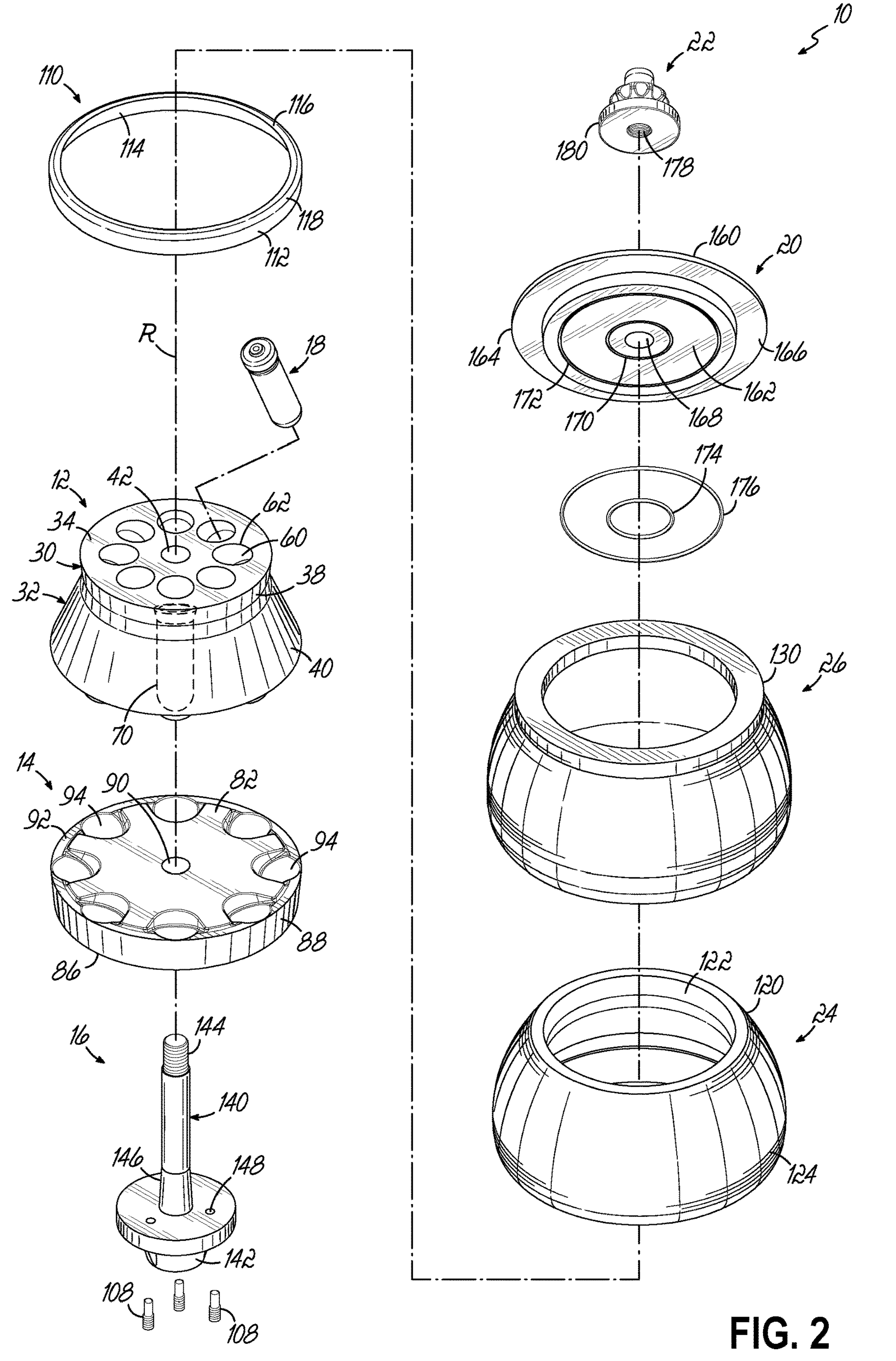
FIG. 2 is an exploded perspective view of the centrifuge rotor of FIG. 1.

With reference to FIGS. 1 and 2, an exemplary centrifuge rotor 10 according to one embodiment of the present invention is illustrated. The rotor 10 includes a rotor body 12 and a pressure plate 14 fixedly coupled to each other and symmetrical about an axis of rotation R defined by a rotor hub 16, about which samples contained in sample containers 18 positioned in the rotor body 12 may be centrifugally rotated. The rotor 10 also includes a lid 20 removably coupled to the rotor hub 16 over the rotor body 12 via a lid screw 22 for assisting in retaining the sample containers 18 within the rotor body 12 during rotation thereof, for example. As described in greater detail below, first and second elongated reinforcements 24, 26 each extend continuously around at least portions of the rotor body 12 and pressure plate 14.

Figure 3:
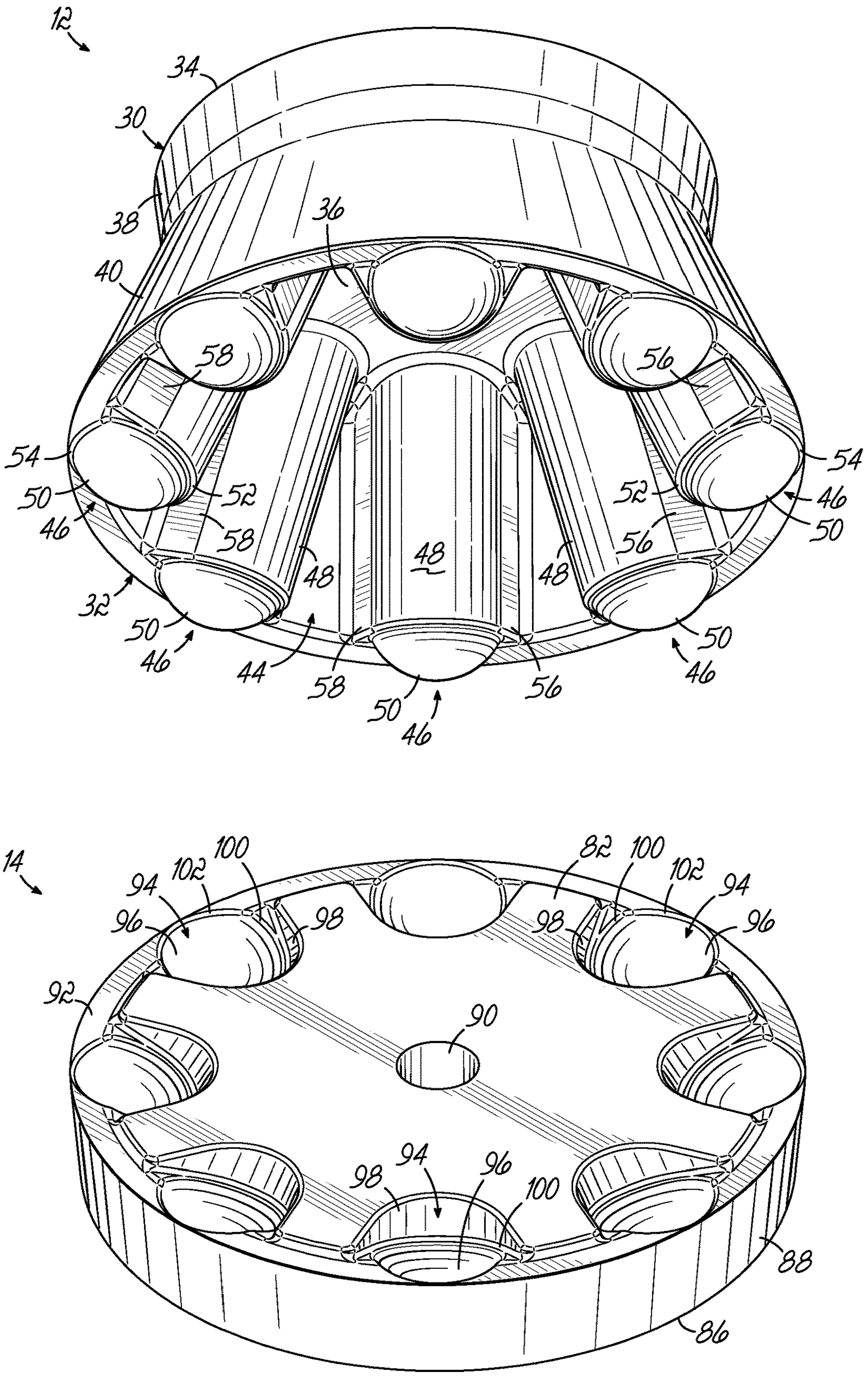
FIG. 3 is a partially disassembled perspective view of the rotor body and pressure plate of the centrifuge rotor of FIG. 1.
Figure 4:
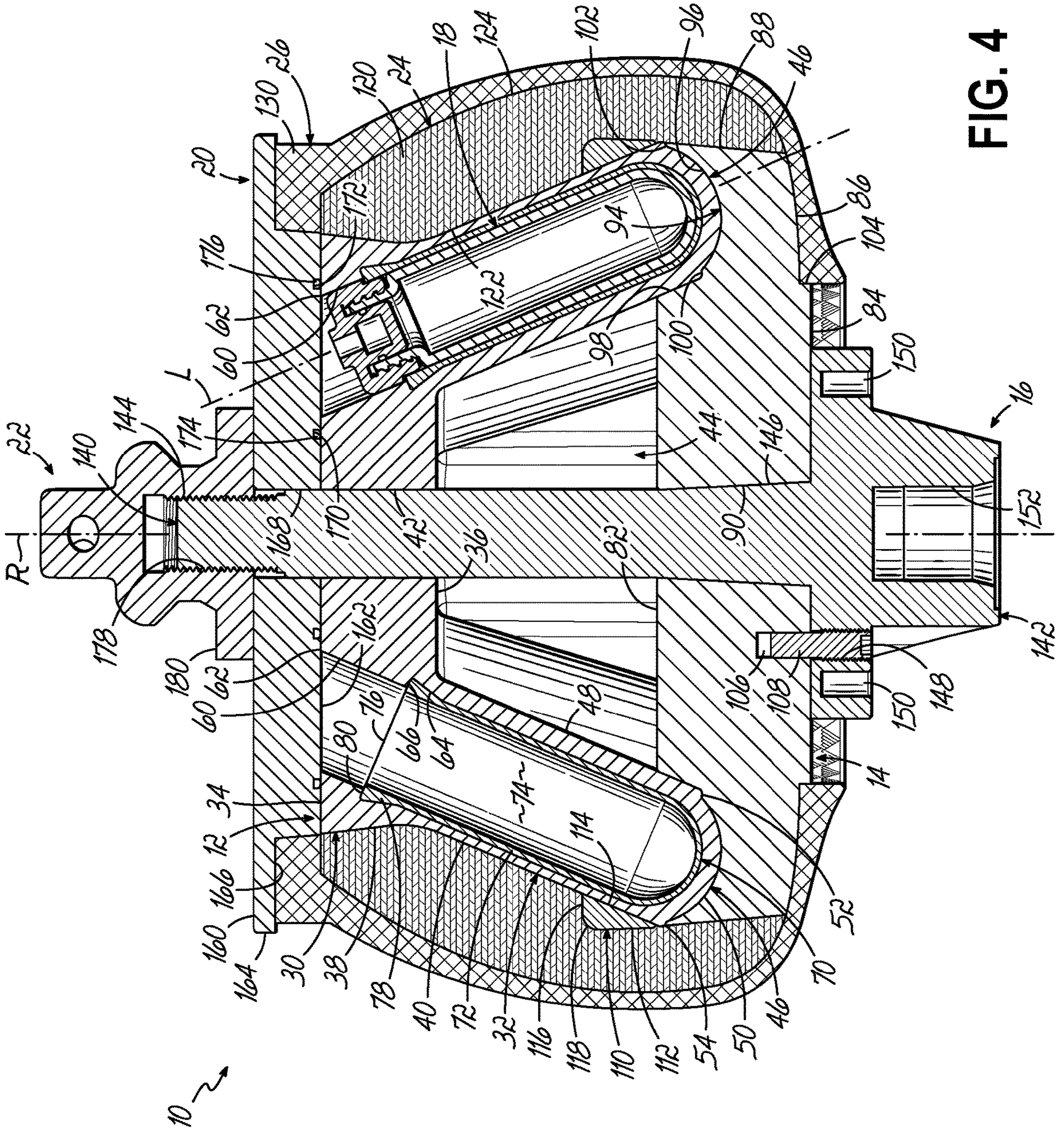
FIG. 4 is a cross-sectional view of the centrifuge rotor of FIG. 1.
Figure 5:
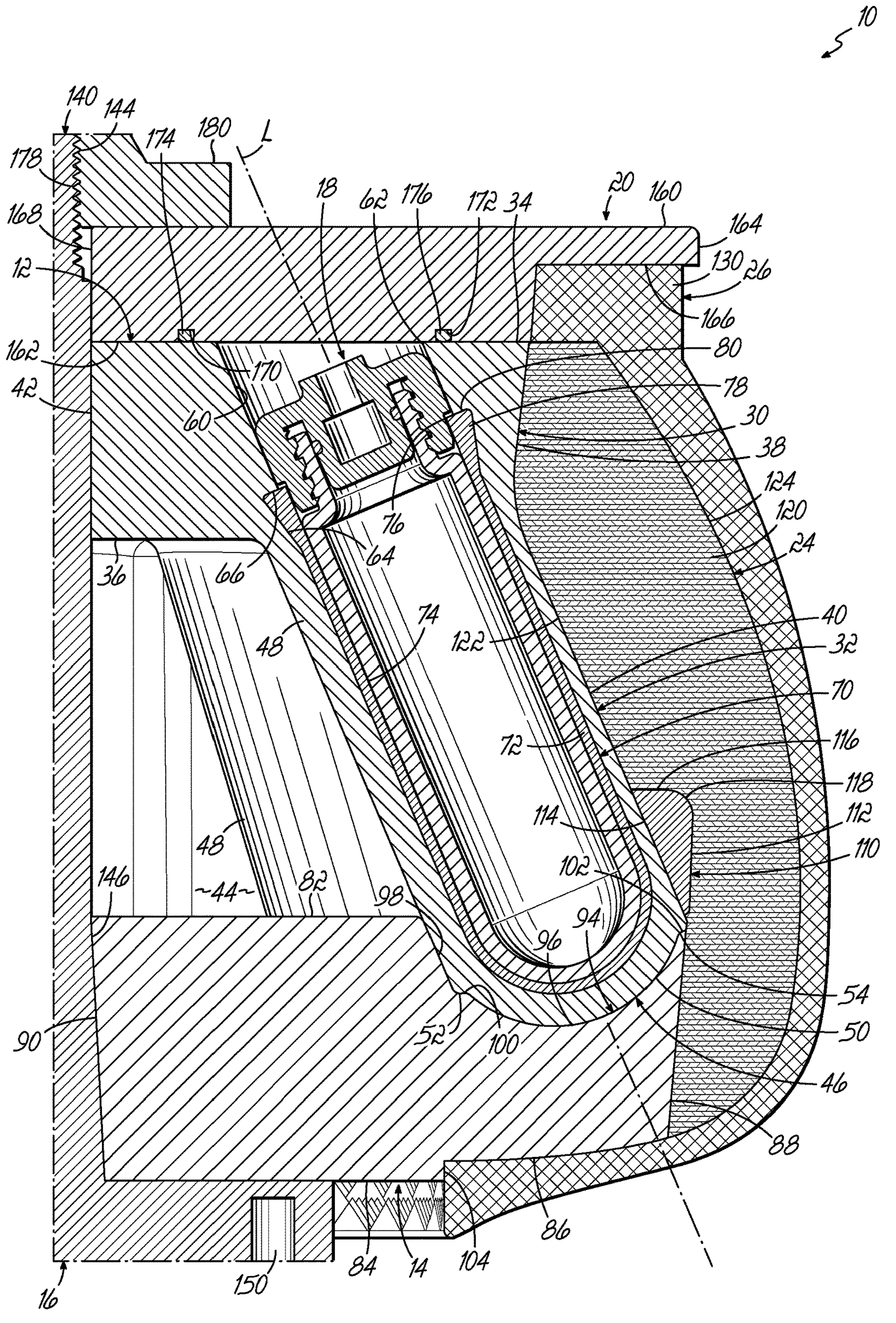
FIG. 5 is a magnified cross-sectional view similar to FIG. 4.

Referring now to FIGS. 3-5, with continuing reference to FIGS. 1 and 2, the illustrated rotor body 12 includes a generally disc-shaped top plate 30 and a generally frustoconical bottom sidewall 32 extending downwardly and outwardly from the top plate 30. The top plate 30 includes an upper surface 34, a lower surface 36 (FIG. 3), and a first side surface 38, and the bottom sidewall 32 includes a second side surface 40. A circular bore 42 extends through the top plate 30 from the upper surface 34 to the lower surface 36 for receiving at least a shaft portion of the hub 16, and is configured to be coaxial with the hub 16 such that the bore 42 may also define the axis of rotation R. In one embodiment, the upper surface 34 of the top plate 30 is generally flat. The lower surface 36 of the top plate 30 and an interior surface of the bottom sidewall 32 together at least partially define an interior space 44 of the rotor body 12. In the embodiment shown, the first side surface 38 tapers slightly radially inwardly from the upper surface 34 toward the second side surface 40. For example, the first side surface 38 may taper radially inwardly at an angle of between approximately 3° and approximately 10° relative to a plane parallel to the axis of rotation R. In the embodiment shown, the first and second side surfaces 38, 40 are generally smooth. As used herein, the term "generally smooth" to describe the side surfaces 38, 40 is intended to describe a surface that does not have a stepped configuration, and is generally free of corners or sharp edges. In this regard, the above-defined term is not intended to define the surface roughness of the surfaces 38, 40. Moreover, the rotor body 12 may be formed such that the generally smooth side surfaces 38, 40 require no additional machining or finishing prior to the application of the reinforcements 24, 26.

A plurality of tubular cell cup holders 46 extend from the lower surface 36 of the top plate 30 into the interior space 44 of the rotor body 12 along the bottom sidewall 32. In the embodiment shown, each tubular cell cup holder 46 is at least partially defined by the bottom sidewall 32 of the rotor body 12, a curved cup holder sidewall 48, and a contoured cup holder bottom wall 50 such that each tubular cell cup holder 46 has a generally elongated U-shaped cross-section (FIG. 4). As shown, each cell cup holder 46 has a respective longitudinal axis that is angled radially outwardly relative to the axis of rotation R. In this regard, the bottom sidewall 32 of the rotor body 12 and the cup holder sidewall 48 are each angled radially outwardly relative to the axis of rotation R. For example, the bottom sidewall 32 of the rotor body 12 and the holder sidewall 48 may each be angled radially outwardly relative to the axis of rotation R by between approximately 20° and approximately 25°, such that each cup holder 46 is angled radially outwardly relative to the axis of rotation R by between approximately 20° and approximately 25°. In the embodiment shown, a first step 52 is provided between the bottom wall 50 and the cup holder sidewall 48, and a second step 54 is provided between the bottom wall 50 and the bottom sidewall 32 of the rotor body 12, the purposes of which are described in greater detail below. Also, a pair of reinforcing flanges 56, 58 (FIG. 3) extends between each cup holder sidewall 48 and the bottom sidewall 32 to assist in strengthening the rigidity of the tubular cell cup holders 46.

The rotor body 12 also includes a plurality of tubular cell hole cavities 60 each extending from the upper surface 34 of the top plate 30 toward the bottom wall 50 of a respective cell cup holder 46 such that each tubular cavity 60 opens to an exterior of the rotor body 12 via an opening 62 in the upper surface 34 and is closed off from the interior space 44 of the rotor body 12 by the sidewall 48 and bottom wall 50 of the cup holder 46. As shown, each tubular cavity 60 has a longitudinal axis that is angled radially outwardly relative to the axis of rotation R in a manner similar to the corresponding cell cup holder 46. In this regard, each tubular cavity 60 and/or corresponding cell cup holder 46 defines a central longitudinal axis L that is angled relative to the axis of rotation R.

In various embodiments, each central longitudinal axis L may be angled relative to the axis of rotation R. In various embodiments, the angle may be between about 15 to about 45 degrees. In some embodiments, the angle may be between about 15 to about 25 degrees for applications where increased rates of rotation and/or cooling efficiency are desirable. In some embodiments, the angle may be between about 25 to about 45 degrees for applications where increased separation efficiency is desirable. In some embodiments, lower volumetric capacities employ higher angles for increased separation. In some embodiments, higher volumetric capacities employ lower angles which may reduce the overall size of the rotor and, thereby, increase cooling efficiency by reducing frictional forces. Generally, increased angles may reduce cooling efficiency while increasing separation capacity and reduced angles may increase cooling efficiency while decreasing separation capacity.

Each of the cavities 60 is suitably sized and shaped to at least receive therein one of the sample containers 18 for centrifugal rotation of the containers 18 about the axis of rotation R. A tapered annular recess 64 is provided at the periphery of each of the cavities 60 in the top plate 30 and/or respective holder 46 generally proximate to the respective opening 62. Each recess 64 is tapered radially outwardly from a position distal from the opening 62 toward a position proximate to the opening 62 to define a ledge 66, the purpose of which is described below. For example, each recess 64 may taper radially outwardly at an angle of between approximately 3° and approximately 10° relative to a plane parallel to the respective central longitudinal axis L. In the embodiment shown, eight cell cup holders 46 and corresponding cell hole cavities 60 are provided for receiving eight sample containers 18. However, any suitable number of cell cup holders 46 and/or cell hole cavities 60 may be used.

As used herein, the term "tubular" refers to any suitable cross-sectional shape, including for example and not limited to rounded shapes (e.g., oval, circular or conical), quadrilateral shapes, regular polygonal or irregular polygonal shapes, or any other suitable shape. Accordingly, this term is not intended to be limited to the generally circular cross-sectional profile of the exemplary tubular holders 46 and cavities 60 illustrated in the figures.

In one embodiment, the rotor body 12, including the top plate 30, bottom sidewall 32, and/or holders 46, is constructed of carbon fiber material. For example, the rotor body 12 may be compression molded from layers of resin-coated carbon fiber laminate material.

As best shown in FIGS. 4 and 5, a cell core or cup 70 is positioned within each of the cavities 60. Each cell cup 70 includes a tubular wall 72 defining a compartment 74 for receiving the respective sample container 18 via an opening 76 of the cup 70. In the embodiment shown, a tapered annular projection 78 is provided on the outer periphery of each of the cell cups 70 generally proximate to the cup opening 76. Each projection 78 is tapered radially outwardly from a position distal from the cup opening 76 toward a position proximate to the cup opening 76 to define a stop surface 80. For example, each projection 78 may taper radially outwardly at an angle of between approximately 3° and approximately 10° relative to the tubular wall 72. The stop surface 80 is configured to operatively engage with the ledge 66 of the corresponding cavity 60 to assist in preventing the cell cup 70 from becoming dislodged from the cavity 60, such as during centrifugation.

In one embodiment, the cell cups 70 are constructed of a homogeneous material compared to that of the rotor body 12 (which is typically a composite material). For example, the cell cups 70 may be constructed of a metallic material, such as titanium. In addition or alternatively, the cell cups 70 may be constructed of ceramics. The cell cups 70 may be co-molded to the rotor body 12 or may be inserted into the cavities 60 after construction of the rotor body 12. In the latter case, the projections 78 may be eliminated to allow the cell cups 70 to be inserted into the cavities 60 unimpeded.

The illustrated centrifuge rotor 10 includes eight cavities 60 and respective cell cups 70 for receiving eight sample containers 18 each having a capacity of 39 mL, such that the centrifuge rotor 10 has a sample capacity of 8×39 mL. However, the centrifuge rotor 10 may have any other suitable sample capacity including but not limited to those described below with respect to FIGS. 6 and 7.

The illustrated pressure plate 14 is generally disc-shaped and includes, in one embodiment, a generally flat upper surface 82, radially inner and outer lower surfaces 84, 86, and a generally smooth tapered side surface 88. The upper surface 82 and radially inner lower surface 84 may be spaced apart from each other to define a maximum thickness of the pressure plate 14. For example, the pressure plate 14 may have a maximum thickness of between approximately 0.25 inch and approximately 1.25 inch. A tapered bore 90 extends through the pressure plate 14 from the upper surface 82 to the radially inner lower surface 84 for receiving at least a shaft portion of the hub 16 and is configured to be coaxial with the hub 16 such that the bore 90 may also define the axis of rotation R. In the embodiment shown, the bore 90 tapers radially outwardly from the upper surface 82 toward the radially inner lower surface 84. For example, the bore 90 may taper radially outwardly at an angle of between approximately 3° and approximately 10° relative to the axis of rotation R. In the embodiment shown, the side surface 88 tapers radially inwardly from the upper surface 82 toward the radially outer lower surface 86. For example, the side surface 88 may taper radially inwardly at an angle of between approximately 3° and approximately 10° relative to a plane parallel to the axis of rotation R. The illustrated pressure plate 14 includes an annular shelf 92 (FIG. 3) provided at the periphery of the upper surface 82 for receiving a bottom portion of the bottom sidewall 32 of the rotor body 12.

As best shown in FIG. 3, a plurality of circumferentially-spaced depressions 94 are provided in the upper surface 82 of the pressure plate 14 and are each configured to receive and engage, in abutting relationship, a respective one of the cup holders 46 of the rotor body 12, such as during high-speed rotation of the rotor 10. In this regard, the depressions 94 are each suitably shaped or configured so as to contact a lower portion of the respective holder 46, such as the bottom wall 50 and a portion of the sidewall 48 thereof. Each of the illustrated depressions 94 includes a contoured bottom surface 96 configured to fully envelop and engage the bottom wall 50 of the respective holder 46 and a curved side surface 98 configured to engage the sidewall 48 of the holder 46. For example, the side surface 98 may be angled relative to the axis of rotation R by between approximately 20° and approximately 25°. A first ledge 100 is provided between the bottom surface 96 and the side surface 98 for engaging the first step 52 of the respective cup holder 46 and a second ledge 102 is provided between the bottom surface 96 and the shelf 92 of the pressure plate 14 for engaging the second step 54 of the cup holder 46, such that cooperation between the steps 52, 54 and respective ledges 100, 102 may assist in locating and/or maintaining a desired position of the rotor body 12 relative to the pressure plate 14. In the embodiment shown, eight depressions 94 are provided corresponding to the eight holders 46. However, any suitable number of depressions 94 may be used.

As best shown in FIGS. 4 and 5, the radially inner and outer lower surfaces 84, 86 are offset from each other to define an outwardly-facing step 104. As shown, the radially inner lower surface 84 is generally flat and the radially outer lower surface 86 is generally curved upwardly from the step 104 toward the side surface 88 of the pressure plate 14 in a generally convex manner. A plurality of circumferentially-spaced bores 106 are provided in the radially inner lower surface 84 of the pressure plate 14 and are each configured to receive a respective pin 108 for operatively coupling the pressure plate 14 to the hub 16. In one embodiment, three bores 106 may be provided and may be circumferentially spaced apart from each other by approximately 120°. However, any suitable number of bores 106 may be used at any suitable spacing.

In one embodiment, the pressure plate 14 is constructed of carbon fiber material. For example, the pressure plate 14 may be compression molded from layers of resin-coated carbon fiber laminate material.

As best shown in FIGS. 3 and 4, the pressure plate 14 operatively couples to the bottom sidewall 32 and/or cell cup holders 46 of the rotor body 12 to close off the interior space 44 of the rotor 10 and to at least partially define the bottom of the rotor 10. Notably, the pressure plate 14 is operatively coupled to the bottom walls 50 of the cup holders 46 to support the cup holders 46 during high-speed rotation of the rotor 10, thereby providing structural integrity and minimizing the likelihood of failure of the rotor 10. In use, when the rotor 10 is spun, the hub 16 applies torque directly to the pressure plate 14 via the pins 108, and the pressure plate 14 applies torque directly to the cup holders 46 and the rotor body 12 via the engagement between the depressions 94 and the bottom portions of the respective cup holders 46. More particularly, the pressure plate 14 may be the primary or only transfer mechanism of torque to the cup holders 46 and the rotor body 12 from the hub 16. To this end, coupling between the pressure plate 14 and the rotor body 12 may be such that the pressure plate 14 exerts pressure against each of the bottom walls 50, thereby providing the required support. The substantial contact of the depressions 94 with the bottom portions of the cup holders 46 facilitates minimizing the possibility of concentrating stresses associated with high-speed rotation on the pressure plate 14.

Coupling between the pressure plate 14 and rotor body 12 may be facilitated by compression-molding of the pressure plate 14, bottom sidewall 32, and holders 46 with one another to thereby yield a unitary structure. Those of ordinary skill in the art will readily appreciate that the illustrated coupling between the pressure plate 14 and rotor body 12 is exemplary rather than intended to be limiting, insofar as variations in the type of coupling between these components are also contemplated. For example, the pressure plate 14 and rotor body 12 may additionally or alternatively be coupled to each other via an adhesive. Such coupling may further be facilitated by the reinforcements 24, 26, as described below.

As best shown in FIGS. 2, 4 and 5, a pressure ring 110 is positioned over the rotor body 12 and, more particularly, over the cell cup holders 46 to assist in strengthening the rotor body 12. For example, the pressure ring 110 may be press-fitted to the rotor body 12 around the cell cup holders 46, such as against the bottom sidewall 32 of the rotor body 12. The illustrated pressure ring 110 has a generally triangular cross-section and is configured to be coaxial with the hub 16 such that the pressure ring 110 may also define the axis of rotation R. In this regard, the pressure ring 110 includes a radially outer surface 112 and a radially inner surface 114 intersecting each other at one end and spaced apart from each other at the other end by an upper surface 116. In the embodiment shown, a radius 118 is provided between the radially outer surface 112 and the upper surface 116 to provide a smooth transition therebetween. The radially inner surface 114 is inclined at an angle relative to the axis of rotation R in a manner similar to the angling of the bottom sidewall 32 of the rotor body 12 relative to the axis of rotation R to match the bottom sidewall 32. For example, the radially inner surface 114 may be angled relative to the axis of rotation R by between approximately 20° and approximately 25°. In this manner, substantially the entire radially inner surface 114 may be capable of operatively engaging the bottom sidewall 32 of the rotor body 12 when the pressure ring 110 is press-fitted to the rotor body 12. As shown, the pressure ring 110 may be configured to be press-fitted to the rotor body 12 at or near a lower portion of the bottom sidewall 32, which may be the location of the rotor body 12 at which maximum pressure occurs during centrifugation. In this regard, the pressure ring 110 may define a lower inner diameter generally equal to a lower outer diameter of the bottom sidewall 32, and may define an upper inner diameter generally equal to an upper outer diameter of the bottom sidewall 32. In the embodiment shown, the radially outer surface 112 of the pressure ring 110 tapers radially inwardly from the upper surface 116 toward the intersection of the outer surface 112 with the inner surface 114 in a manner similar to the tapering of the side surface 88 of the pressure plate 14 to provide a smooth transition therebetween when the pressure ring 110 is press-fitted to the rotor body 12. For example, the radially outer surface 112 may taper radially inwardly at an angle of between approximately 3° and approximately 10° relative to a plane parallel to the axis of rotation R.

In one embodiment, the pressure ring 110 is constructed of a homogenous material. The pressure ring 110 may be constructed of a relatively hard material compared to that of the rotor body 12 and/or pressure plate 14. For example, the pressure ring 110 may be constructed of a metallic material, such as titanium. In addition or alternatively, the pressure ring 110 may be constructed of ceramics.

As described above, in one embodiment, the coupling between the pressure plate 14 and rotor body 12 may further be facilitated by the first and/or second reinforcements 24, 26, which may be applied by winding (e.g., helically winding and/or circularly winding) one or more continuous strands of high strength fiber such as a single tow or strand of carbon fiber (e.g. a resin-coated carbon fiber) around the exterior surfaces of the rotor body 12 and/or pressure plate 14, for example. Especially when the fiber is resin coated, after compression-molding (i.e., wherein heat and pressure are applied), the pressure plate 14 and rotor body 12 become a unitary structure. In a specific embodiment, making of the rotor 10 may include curing a resin-coated carbon fiber tow or strand of reinforcement such that the strand becomes integral with the rotor body 12 and/or the pressure plate 14.

The illustrated first reinforcement 24 includes a first strand of material 120 circularly wound around at least portions of the rotor body 12, pressure plate 14, and pressure ring 110. The first strand 120 may be, for example, a carbon fiber strand or filament. The first strand or filament 120 may be a composite material of carbon fiber and resin and/or a thermoset coated fiber that, at the conclusion of the winding process, is cured so as to be integrally formed with the rotor body 12 and pressure plate 14, for example. Alternatively, various other high-tensile, high-modulus materials, such as glass fiber, synthetic fiber such as para-aramid fiber (e.g., Kevlar®), thermoplastic filament such as ultra high molecular weight polyethylene, metal wire, or other materials suitable for reinforcing the rotor body 12 and pressure plate 14 may be used instead of carbon fiber. Any such materials may be used as a single continuous filament or as multiple filaments, and many such materials can be applied with a resin coating which can be set in a manner analogous to the setting of resin-coated carbon fiber. The first reinforcement 24 may comprise a single fiber tow, multiple fiber tows or unidirectional tape in various alternative embodiments.

In the embodiment shown, especially in FIG. 4, the first strand 120 is wound around the first and second outer surfaces 38, 40 of the rotor body 12 along a generally circular reinforcement path. For example, the first strand 120 may be wound around the portion of the outer surfaces 38, 40 remaining exposed when the pressure ring 110 is press-fitted over the bottom sidewall 32 of the rotor body 12. The first strand 120 is also wound around the radially outer surface 112 of the pressure ring 110 and around the side surface 88 of the pressure plate 14 along the same generally circular reinforcement path.

The first strand 120 may be wound upon the rotor body 12, pressure plate 14, and pressure ring 110 by rotating the assembled rotor body 12, pressure plate 14, and pressure ring 110 about the axis of rotation R while applying the first strand 120 along the desired path, for example. The first strand 120 may be wound repeatedly around the rotor body 12, pressure plate 14, and pressure ring 110 along the reinforcement path. This repeated winding of the strand 120 around the respective surfaces 38, 40, 88, 112 yields a plurality of layers of material covering the rotor body 12, pressure plate 14, and pressure ring 110 that thereby define the first reinforcement 24. As shown, the first reinforcement 24 defines a radially inner surface 122 which may conform to the outer surfaces 38, 40, 88, 112 of the rotor body 12, pressure plate 14, and pressure ring 110, and defines an outer surface 124 which may be generally smooth.

Interaction of the inner surface 122 of the first reinforcement 24 with the upper surface 116 of the pressure ring 110 may effectively lock the pressure ring 110 against the rotor body 12. Interaction of the inner surface 122 of the first reinforcement 24 with the tapered first outer surface 38 of the top plate 30, the tapered outer surface 88 of the pressure plate 14, and/or the tapered outer surface 112 of the pressure ring 110 may assist in preventing or inhibiting axial displacement of the first reinforcement 24 relative to the rotor body 12, pressure plate 14, and/or pressure ring 110, such as during centrifugation. For example, each of the tapered surfaces 38, 88, 112 may prevent or inhibit axial displacement of the first reinforcement 24 in an upward direction.

The illustrated second reinforcement 26 includes a second strand of material 130 helically wound around at least portions of the rotor body 12, pressure plate 14, lid 20, and pressure ring 110. In the embodiment shown, the second strand 130 is helically wound around the outer surface 124 of the first reinforcement 24 and is thereby radially spaced apart from portions of the rotor body 12, pressure plate 14, and pressure ring 110. The second strand 130 may be, for example, a carbon fiber strand or filament. The second strand or filament 130 may be a composite material of carbon fiber and resin and/or a thermoset coated fiber that, at the conclusion of the winding process, is cured so as to be integrally formed with the rotor body 12, pressure plate 14, and first reinforcement 24, for example. Alternatively, various other high-tensile, high-modulus materials, such as glass fiber, synthetic fiber such as para-aramid fiber (e.g., Kevlar®), thermoplastic filament such as ultra high molecular weight polyethylene, metal wire, or other materials suitable for reinforcing the rotor body 12 and pressure plate 14 may be used instead of carbon fiber. Any such materials may be used as a single continuous filament or as multiple filaments, and many such materials can be applied with a resin coating which can be set in a manner analogous to the setting of resin-coated carbon fiber. The second reinforcement 26 may comprise a single fiber tow, multiple fiber tows or unidirectional tape in various alternative embodiments.

In the embodiment shown, the second strand 130 is wound around the outer surface 124 of the first reinforcement 24 along a generally helical reinforcement path. The second strand 130 is also wound around the radially outer lower surface 86 of the pressure plate 14 to the outwardly facing step 104 of the pressure plate 14 along the same generally helical reinforcement path, and is also wound around at least a portion of the lid 20 along the same generally helical reinforcement path. As discussed below, the lid 20 is removably seated on the rotor body 12 and on the second reinforcement 26. The outwardly facing step 104 of the pressure plate 14 is positioned radially inwardly of the central longitudinal axes L of the cell cup holders 46, such that the second strand 130 extends along the lower surface 86 of the pressure plate 14 radially inwardly relative to the central longitudinal axes L of the cell cup holders 46. The outwardly facing step 104 of the pressure plate 14 is also positioned radially inwardly relative to the bottom walls 50 of the cell cup holders 46, such that the second strand 130 also extends along the lower surface 86 of the pressure plate 14 radially inwardly relative to the bottom walls 50 of the cell cup holders 46. By extending radially inwardly relative to and past the bottom walls 50 of the cell cup holders 46, the second reinforcement 26 is better able to resist centrifugal forces (or the components thereof) which occur in an axial direction, as described in U.S. Pat. No. 8,323,169, the disclosure of which was incorporated by reference above.

The second strand 130 may be wound upon the pressure plate 14, lid 20, and first reinforcement 24 by rotating the assembled rotor body 12, pressure plate 14, lid 20, and first reinforcement 24 about the axis of rotation R while applying the strand 130 along the desired path, for example. The second strand 130 may be wound repeatedly around the pressure plate 14, lid 20, and first reinforcement 24 along the reinforcement path. This repeated winding of the strand 130 yields a plurality of layers of material covering the pressure plate 14, lid 20, and first reinforcement 24 that thereby define the second reinforcement 26. In one embodiment, the second strand 130 may be applied in a manner similar to that described in U.S. Pat. No. 8,323,169, which is incorporated by reference herein in its entirety.

The illustrated rotor hub 16 includes an elongate axle 140 extending axially from a head 142. The axle 140 is sized and shaped to extend through the bores 42, 90 of the rotor body 12 and pressure plate 14 with a close fit therebetween, and includes a threaded end 144 distal from the head 142 and a tapered end 146 proximate to the head 142. The threaded end 144 is configured to threadably engage with the lid screw 22 for removably coupling the lid 20 to the rotor hub 16 over the rotor body 12. The tapered end 146 tapers radially outwardly toward the head 142 to match the tapering of the bore 90 of the pressure plate 14, such that interaction between the tapered end 146 and the tapered bore 90 may assist in removably securing the rotor hub 16 to the pressure plate 14. For example, the tapered end 146 may taper radially outwardly at an angle of between approximately 3° and approximately 10° relative to the axis of rotation R.

The head 142 of the rotor hub 16 includes a plurality of circumferentially-spaced threaded bores 148, each configured to threadably receive one of the pins 108 for operatively coupling the pressure plate 14 to the hub 16. In the embodiment shown, three threaded bores 148 are provided and are circumferentially spaced apart from each other by approximately 120° to correspond with the bores 106 of the pressure plate 14. However, any suitable number of bores 148 may be used at any suitable spacing. Two or more blind bores 150 are provided in a bottom side of the rotor hub 16 for receiving respective pins of a centrifuge spindle (not shown) to operatively couple the rotor hub 16 to the centrifuge spindle. A central recess 152 provided in a bottom side of the rotor hub 16 may also receive a portion of the centrifuge spindle, such as to assist in stabilizing the rotor hub 16 during rotation. In the embodiment shown, the head 142 of the rotor hub 16 is positioned radially inwardly relative to the outwardly facing step 104 of the pressure plate 14 and spaced apart therefrom such that the head 142 is also positioned radially inwardly relative to and spaced apart from the second reinforcement 26.

In one embodiment, the rotor hub 16 is constructed of a relatively hard material compared to that of the rotor body 12 and/or pressure plate 14. For example, the rotor hub 16 may be constructed of a metallic material, such as titanium.

The illustrated lid 20 is generally disc-shaped and includes an upper surface 160, a lower surface 162, and an annular flange 164 defining a peripheral recess 166 for receiving a portion of the second reinforcement 26. The lower surface 162 is generally flat and has a cross dimension generally similar to that of the upper surface 34 of the top plate 30 of the rotor body 12, such that substantially the entire upper surface 34 of the top plate 30 may be capable of operatively engaging the lower surface 162 of the lid 20 when the lid 20 is removably coupled to the rotor hub 16 over the rotor body 12. A bore 168 extends through the lid 20 from the upper surface 160 to the lower surface 162 for receiving at least a portion of the hub 16, such as the axle 140.

First and second annular grooves 170, 172 are provided in the lower surface 162 for receiving first and second O-rings 174, 176, respectively. As shown, the first and second annular grooves 170, 172 and first and second O-rings 174, 176 may each have a generally rectangular cross-section. The first and second annular grooves 170, 172 are radially spaced apart from each other by a distance greater than a cross dimension of the openings 62 in the upper surface 34 of the top plate 30 of the rotor body 12. For example, the first annular groove 170 may be configured to be radially inward of the openings 62 and the second annular groove 172 may be configured to be radially outward of the openings 62 when the lid 20 is removably coupled to the rotor hub 16 over the rotor body 12. In this manner, the O-rings 174, 176 may be capable of providing a fluid-tight seal between the lid 20 and the rotor body 12 both radially inwardly of and radially outwardly of the openings 62. The interface between the flat lower surface 162 of the lid 20 and the flat upper surface 34 of the top plate 30 may assist in providing such a fluid-tight seal to prevent samples from inadvertently escaping from the respective sample containers 18 as a result of rotation, evaporation, or any other event which may cause at least portions of the samples to move toward the lid 20.

In one embodiment, the lid 20 is constructed of carbon fiber material. For example, the lid 20 may be compression molded from layers of resin-coated carbon fiber laminate material.

Once the rotor body 12 and pressure plate 14 are seated on the rotor hub 16, the lid 20 of the rotor 10 may be removably coupled to the rotor hub 16 over the rotor body 12 via the lid screw 22. In this regard, the lid screw 22 includes a threaded bore 178 which threadably receives the threaded end 144 of the axle 140 of the rotor hub 16. The illustrated lid screw 22 also includes a lower annular flange 180 configured to cover at least a central portion of the lid 20. The lid screw 22 may be tightened against the lid 20 via a tool rod (not shown), for example. When removably coupled to the rotor hub 16 over the rotor body 12 via the lid screw 22, the lid 20 blocks access to the sample containers 18 held in the cavities 60, such as during high speed rotation. The centrifuge spindle may then be actuated to drive the rotor 10 into high-speed, centrifugal rotation.

In one embodiment, the rotor body 12 and pressure plate 14 may be seated on the rotor hub 16, or on a tool similar to the rotor hub 16, during compression molding of the rotor body 12 and/or pressure plate 14, and/or during winding of the first and/or second reinforcements 24, 26, to assist in locating and/or maintaining a desired position of the rotor body 12 relative to the pressure plate 14, for example. Similarly, the lid 20 may be removably coupled to the rotor body 12 (or tool) during winding of at least the second reinforcement 26, to assist in ensuring that a portion of the second reinforcement 26 is received within the peripheral recess 166 of the lid 20. During centrifugation, the first and second windings 24, 26 may contribute to the strength of the rotor 10 and thereby assist in maintaining the structural integrity of the rotor 10 under high stresses and strains. For example, the first reinforcement 24 may primarily assist in counteracting radially outwardly directed forces and the second reinforcement 26 may assist in counteracting both radially outwardly directed forces and axially downwardly directed forces.

The pressure ring 110 may also contribute to the strength of the rotor 10 during centrifugation. For example, the pressure ring 110 may assist in evenly distributing both radially outwardly and axially outwardly directed forces from the rotor body 12 to the first reinforcement 24, thereby reducing or eliminating point stresses.

Figure 6:
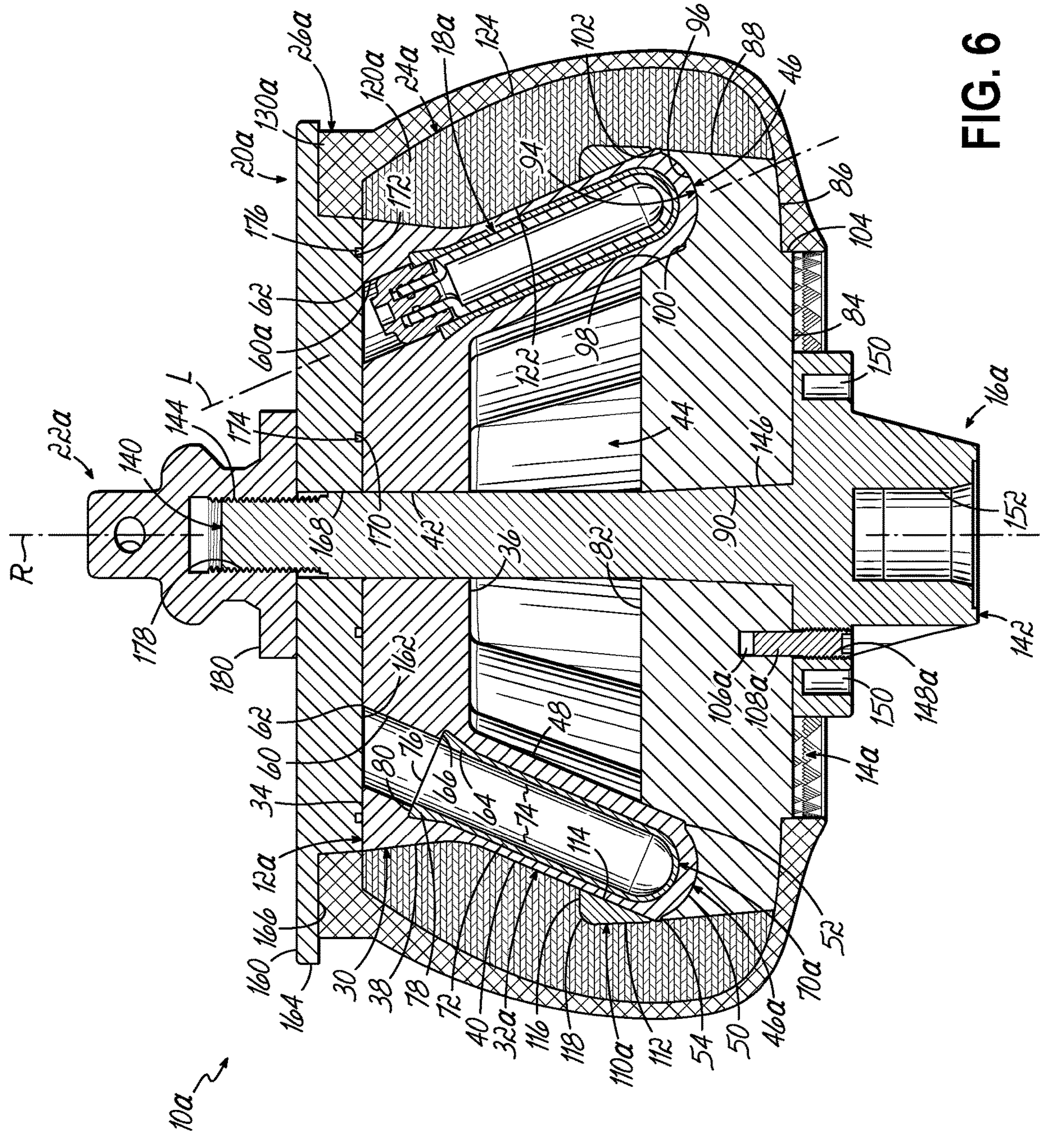
FIG. 6 is a cross-sectional view of an alternative centrifuge rotor in accordance with another embodiment of the present invention.

Turning now to FIG. 6, wherein like numerals represent like features, another exemplary centrifuge rotor 10*a* according to another embodiment of the present invention is illustrated. The rotor 10*a* includes a rotor body 12*a* and a pressure plate 14*a* fixedly coupled to each other and symmetrical about an axis of rotation R defined by a rotor hub 16*a*, about which samples contained in sample containers 18*a* positioned in the rotor body 12*a* may be centrifugally rotated. The rotor 10*a* also includes a lid 20*a* removably coupled to the rotor hub 16*a* over the rotor body 12*a* via a lid screw 22*a* for assisting in retaining the sample containers 18*a* within the rotor body 12*a* during rotation thereof, for example. Similar to the embodiment shown in FIGS. 1-5, first and second elongated reinforcements 24*a*, 26*a* each extend continuously around at least portions of the rotor body 12*a* and pressure plate 14*a*.

The primary difference between the centrifuge rotor 10 illustrated in FIGS. 1-5 and the centrifuge rotor 10*a* illustrated in the FIG. 6 is the sample capacity and, more particularly, the size and number of the cavities 60, 60*a* and respective cell cups 70, 70*a* and sample containers 18, 18*a*. In this regard, the illustrated centrifuge rotor 10*a* has a sample capacity of 14×13.5 mL. In other words, the centrifuge rotor 10*a* includes 14 cavities 60*a* and respective cell cups 70*a* for receiving 14 sample containers 18*a* each having a capacity of 13.5 mL.

Various other features of the centrifuge rotor 10*a* are generally similar to those described above with respect to FIGS. 1-5 and are not repeated here for the sake of brevity.

Figure 7:
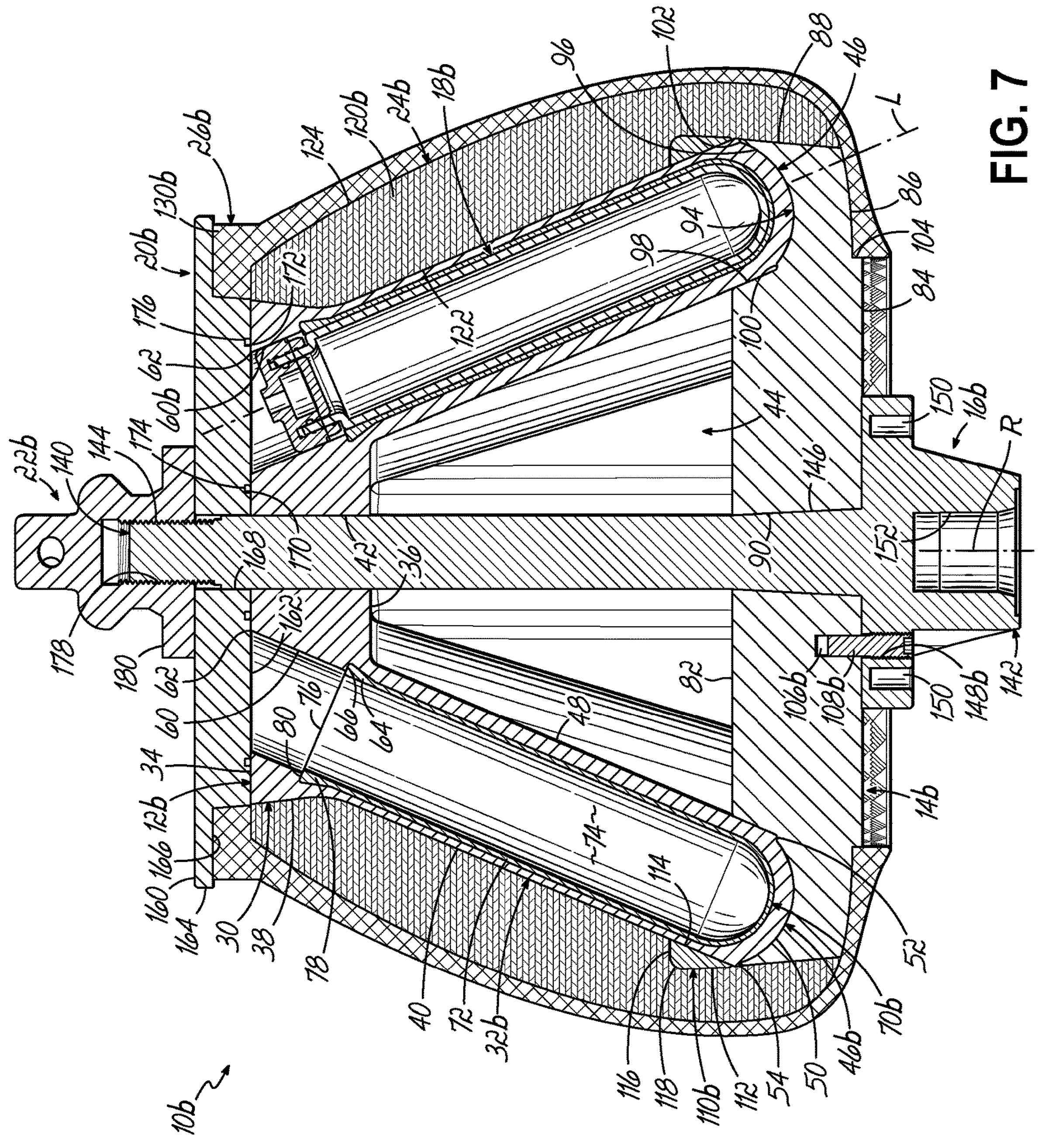
FIG. 7 is a cross-sectional view of an alternative centrifuge rotor in accordance with another embodiment of the present invention.

Turning now to FIG. 7, wherein like numerals represent like features, another exemplary centrifuge rotor 10*b* according to another embodiment of the present invention is illustrated. The rotor 10*b* includes a rotor body 12*b* and a pressure plate 14*b* fixedly coupled to each other and symmetrical about an axis of rotation R defined by a rotor hub 16*b*, about which samples contained in sample containers 18*b* positioned in the rotor body 12*b* may be centrifugally rotated. The rotor 10*b* also includes a lid 20*b* removably coupled to the rotor hub 16*b* over the rotor body 12*b* via a lid screw 22*b* for assisting in retaining the sample containers 18*b* within the rotor body 12*b* during rotation thereof, for example. Similar to the embodiment shown in FIGS. 1-5, first and second elongated reinforcements 24*b*, 26*b* each extend continuously around at least portions of the rotor body 12*b* and pressure plate 14*b*.

The primary difference between the centrifuge rotor 10 illustrated in FIGS. 1-5 and the centrifuge rotor 10*b* illustrated in the FIG. 7 is the sample capacity and, more particularly, the size of the cavities 60, 60*b* and respective cell cups 70, 70*b* and sample containers 18, 18*b*. In this regard, the illustrated centrifuge rotor 10*b* has a sample capacity of 8×100 mL. In other words, the centrifuge rotor 10*b* includes eight cavities 60*b* and respective cell cups 70*b* for receiving eight sample containers 18*b* each having a capacity of 100 mL.

Various other features of the centrifuge rotor 10*b* are generally similar to those described above with respect to FIGS. 1-5 and are not repeated here for the sake of brevity.

Figure 8:
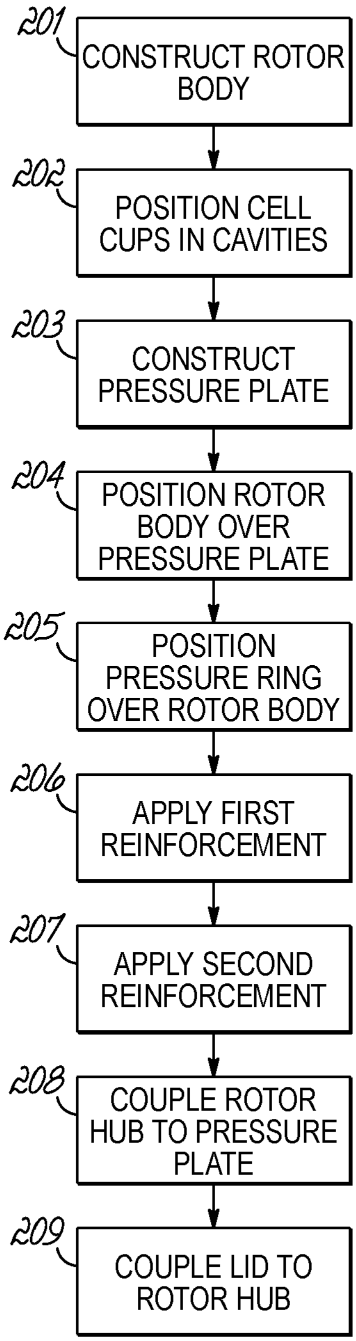
FIG. 8 is a flow diagram illustrating an exemplary method of manufacturing a centrifuge rotor in accordance with the present invention.

Turning now to FIG. 8, an exemplary method of manufacturing the centrifuge rotor 10, 10*a*, 10*b* is provided. At step 201, the rotor body 12, 12*a*, 12*b* is constructed. For example, the rotor body 12, 12*a*, 12*b* may be compression molded from layers of resin-coated carbon fiber laminate material. At step 202, each of the cell cores or cups 70, 70*a*, 70*b* is positioned within a respective one of the cavities 60, 60*a*, 60*b* of the rotor body 12, 12*a*, 12*b*. The cell cups 70, 70*a*, 70*b* may be co-molded to the rotor body 12, 12*a*, 12*b* (e.g., during step 201) or may be inserted into the cavities 60, 60*a*, 60*b* after construction of the rotor body 12, 12*a*, 12*b*. At step 203, the pressure plate 14, 14*a*, 14*b* is constructed. For example, the pressure plate 14, 14*a*, 14*b* may be compression molded from layers of resin-coated carbon fiber laminate material.

At step 204, the rotor body 12, 12*a*, 12*b* is positioned on the pressure plate 14, 14*a*, 14*b*. During step 204, the rotor body 12, 12*a*, 12*b* and pressure plate 14, 14*a*, 14*b* may be seated on the rotor hub 16, 16*a*, 16*b*, or on a tool similar to the rotor hub 16, 16*a*, 16*b*, to assist in locating and/or maintaining a desired position of the rotor body 12, 12*a*, 12*b* relative to the pressure plate 14, 14*a*, 14*b*, for example. In one embodiment, step 204 may include coupling the rotor body 12, 12*a*, 12*b* and the pressure plate 14, 14*a*, 14*b* together. For example, the pressure plate 14, 14*a*, 14*b* and the bottom sidewall 32, 32*a*, 32*b* and holders 46, 46*a*, 46*b* of the rotor body 12, 12*a*, 12*b* may be compression molded with one another to thereby yield a unitary structure. In addition or alternatively, the rotor body 12, 12*a*, 12*b* and the pressure plate 14, 14*a*, 14*b* may be coupled to each other via an adhesive. For example, the rotor body 12, 12*a*, 12*b* and the pressure plate 14, 14*a*, 14*b* may be initially coupled to each other via an adhesive prior to compression molding the rotor body 12, 12*a*, 12*b* and the pressure plate 14, 14*a*, 14*b* to each other. Alternatively, the rotor body 12, 12*a*, 12*b* and the pressure plate 14, 14*a*, 14*b* may be compression molded to each other during a later step, as described below.

At step 205, the pressure ring 110, 110*a*, 110*b* is positioned over the rotor body 12, 12*a*, 12*b*. For example, the pressure ring 110, 110*a*, 110*b* may be press-fitted to the rotor body 12, 12*a*, 12*b* around the cell cup holders 46, 46*a*, 46*b*, such as against the bottom sidewall 32, 32*a*, 32*b* of the rotor body 12, 12*a*, 12*b*.

At step 206, the first reinforcement 24, 24*a*, 24*b* is applied to at least the rotor body 12, 12*a*, 12*b* and the pressure plate 14, 14*a*, 14*b*. For example, the first strand of material 120, 120*a*, 120*b* may be circularly wound around at least portions of the rotor body 12, 12*a*, 12*b*, the pressure plate 14, 14*a*, 14*b*, and the pressure ring 110, 110*a*, 110*b*. During step 206, the rotor body 12, 12*a*, 12*b* and pressure plate 14, 14*a*, 14*b* may be seated on the rotor hub 16, 16*a*, 16*b*, or on a tool similar to the rotor hub 16, 16*a*, 16*b*, to assist in locating and/or maintaining a desired position of the rotor body 12, 12*a*, 12*b* relative to the pressure plate 14, 14*a*, 14*b*, for example. In one embodiment, step 206 may include curing the first strand 120, 120*a*, 120*b* after the winding process so as to be integrally formed with the rotor body 12, 12*a*, 12*b* and the pressure plate 14, 14*a*, 14*b*. Such curing may also include compression molding the rotor body 12, 12*a*, 12*b* and the pressure plate 14, 14*a*, 14*b* together. Alternatively, the first strand 120, 120*a*, 120*b* may be cured during a later step, as described below.

At step 207, the second reinforcement 26, 26*a*, 26*b* is applied to at least the pressure plate 14, 14*a*, 14*b* and the first reinforcement 24, 24*a*, 24*b*. For example, the second strand of material 130, 130*a*, 130*b* may be helically wound around at least portions of the rotor body 12, 12*a*, 12*b*, the pressure plate 14, 14*a*, 14*b*, the lid 20, 20*a*, 20*b*, and the pressure ring 110, 110*a*, 110*b*. During step 207, the rotor body 12, 12*a*, 12*b* and pressure plate 14, 14*a*, 14*b* may be seated on the rotor hub 16, 16*a*, 16*b*, or on a tool similar to the rotor hub 16, 16*a*, 16*b*, to assist in locating and/or maintaining a desired position of the rotor body 12, 12*a*, 12*b* relative to the pressure plate 14, 14*a*, 14*b*, for example. Similarly, the lid 20, 20*a*, 20*b* may be removably coupled to the rotor hub 16, 16*a*, 16*b* (or tool) during step 207, to assist in ensuring that a portion of the second reinforcement 26, 26*a*, 26*b* is received within the peripheral recess 166, 166*a*, 166*b* of the lid 20, 20*a*, 20*b*. In one embodiment, step 207 may include curing the second strand 130, 130*a*, 130*b* after the winding process so as to be integrally formed with the rotor body 12, 12*a*, 12*b*, the pressure plate 14, 14*a*, 14*b*, and the first reinforcement 24, 24*a*, 24*b*. Such curing may also include curing the first strand 120, 120*a*, 120*b*, and/or compression molding the rotor body 12, 12*a*, 12*b* and the pressure plate 14, 14*a*, 14*b* together.

At step 208, the rotor hub 16, 16*a*, 16*b* is operatively coupled to the pressure plate 14, 14*a*, 14*b*. For example, each of the pins 108, 108*a*, 108*b* may be threadably received by a respective one of the threaded bores 148, 148*a*, 148*b* and inserted into the corresponding bore 106, 106*a*, 106*b* of the pressure plate 14, 14*a*, 14*b*. As described above, step 208 may be performed before or during one or more of steps 204, 206, or 207.

At step 209, the lid 20, 20*a*, 20*b* is removably coupled to the rotor hub 16, 16*a*, 16*b*. For example, the lid 20, 20*a*, 20*b* may be removably coupled to the rotor hub 16, 16*a*, 16*b* over the rotor body 12, 12*a*, 12*b* via the lid screw 22, 22*a*, 22*b*, which may be tightened against the lid 20, 20*a*, 20*b* via a tool rod. Usually, the lid 20, 20*a*, 20*b* is coupled over the rotor body 12, 12*a*, 12*b* only after samples in sample containers have been inserted into cavities 60, 60*a*, 60*b*.

The assembled centrifuge rotor 10, 10*a*, 10*b* may then be driven into high-speed, centrifugal rotation via a centrifuge spindle. After centrifugation, the lid 20, 20*a*, 20*b* is removed from the rotor body 12, 12*a*, 12*b* and the samples in sample containers are removed from cavities 60, 60*a*, 60*b*.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A fixed angle centrifuge rotor, comprising:

a rotor body having an upper surface and a plurality of tubular cavities extending from the upper surface to respective bottom walls, each cavity being configured to receive a sample container therein;

a pressure plate operatively coupled to the bottom walls and configured to transfer torque to the bottom walls, wherein the pressure plate is configured to be directly coupled to a rotor hub and to receive torque directly from the rotor hub via a plurality of bores defined by a lower surface of the pressure plate; and at least one pin disposed within a bore of the plurality of bores for directly coupling the pressure plate to the rotor hub.

2. The fixed angle centrifuge rotor of claim 1, wherein the pressure plate includes an upper surface and a plurality of depressions spaced apart from each other on the upper surface and each including a bottom surface, and wherein the bottom surfaces fully envelop and engage the bottom walls.

3. The fixed angle centrifuge of claim 1, wherein the bores are each configured to receive a respective pin for directly coupling the pressure plate to the rotor hub.

4. The fixed angle centrifuge of claim 1, wherein the pressure plate includes a central bore configured to receive a shaft portion of the rotor hub, and wherein the central bore is tapered.

5. The fixed angle centrifuge rotor of claim 1, wherein the pressure plate includes an external side surface, and wherein the external side surface is tapered.

6. The fixed angle centrifuge rotor of claim 1, further comprising:

a first elongate reinforcement extending around at least one exterior surface of the rotor body and at least one exterior surface of the pressure plate along a first path; and a second elongate reinforcement extending around an exterior surface of the first elongate reinforcement along a second path.

7. The fixed angle centrifuge rotor of claim 6, wherein the first path is circular.

8. The fixed angle centrifuge rotor of claim 7, wherein the second path is helical.

9. The fixed angle centrifuge rotor of claim 6, wherein the rotor body includes an external side surface, wherein the external side surface is tapered, and wherein the first elongate reinforcement defines an inner surface which conforms to the external side surface.

10. The fixed angle centrifuge rotor of claim 6, wherein the pressure plate includes an external side surface, wherein the external side surface is tapered, and wherein the first elongate reinforcement defines an inner surface which conforms to the external side surface.

11. The fixed angle centrifuge rotor of claim 1, further comprises:

an elongate reinforcement extending between a first position radially outward relative to at least one exterior surface of the rotor body and a second position below a portion of the pressure plate and radially inward relative to the bottom walls.

12. The fixed angle centrifuge rotor of claim 1, further comprising:

a lid having a planar lower surface, wherein the rotor body includes a planar upper surface engaging the planar lower surface.

13. The fixed angle centrifuge rotor of claim 12, wherein at least one of the planar lower surface of the lid or the planar upper surface of the rotor body includes a pair of annular grooves configured to receive a pair of O-rings.

14. The fixed angle centrifuge rotor of claim 1, further comprising:

a pressure ring extending around an exterior surface of the rotor body and press-fitted to the rotor body.

15. The fixed angle centrifuge rotor of claim 14, further comprising:

a first elongate reinforcement extending around at least one exterior surface of the rotor body and at least one exterior surface of the pressure ring along a first path.

16. The fixed angle centrifuge rotor of claim 15, further comprising:

a second elongate reinforcement extending around an exterior surface of the first elongate reinforcement along a second path.

17. The fixed angle centrifuge rotor of claim 16, wherein the first path is circular and wherein the second path is helical.

18. The fixed angle centrifuge rotor of claim 14, wherein the pressure ring is constructed of at least one of a metallic material or a ceramic material.

19. A fixed angle centrifuge rotor, comprising:

a rotor body having an upper surface and a plurality of tubular cavities extending from the upper surface to respective bottom walls, each cavity being configured to receive a sample container therein;

a pressure plate operatively coupled to the bottom walls and configured to transfer torque to the bottom walls;

a first elongate reinforcement continuously extending around at least one exterior surface of the rotor body and at least one exterior surface of the pressure plate along a first path; and a second elongate reinforcement continuously extending around an exterior surface of the first elongate reinforcement along a second path.

20. The fixed angle centrifuge rotor of claim 19, further comprising:

a lid having a planar lower surface, wherein the rotor body includes a planar upper surface engaging the planar lower surface.

21. The fixed angle centrifuge rotor of claim 20, wherein at least one of the planar lower surface of the lid or the planar upper surface of the rotor body includes a pair of annular grooves configured to receive a pair of O-rings.

22. A fixed angle centrifuge rotor, comprising:

a rotor body having an upper surface and a plurality of tubular cavities extending from the upper surface to respective bottom walls, each cavity being configured to receive a sample container therein;

a pressure plate operatively coupled to the bottom walls and configured to transfer torque to the bottom walls; and an elongate reinforcement extending between a first position radially outward relative to at least one exterior surface of the rotor body and a second position below a portion of the pressure plate and that further extends radially inward past the bottom walls.

23. The fixed angle centrifuge rotor of claim 22, wherein the pressure plate includes first and second lower surfaces offset from each other to define a step, and wherein the elongate reinforcement extends to the step.

24. The fixed angle centrifuge rotor of claim 22, further comprising:

a lid having an annular flange defining a peripheral recess, wherein a portion of the elongate reinforcement is received within the peripheral recess.

25. The fixed angle centrifuge rotor of claim 22, wherein the elongate reinforcement extends along a helical path.

26. The fixed angle centrifuge rotor of claim 22, wherein the elongate reinforcement includes at least one carbon fiber strand.

27. A fixed angle centrifuge rotor, comprising:

a rotor body having an upper surface and a plurality of tubular cavities extending from the upper surface to respective bottom walls, each cavity being configured to receive a sample container therein; and a pressure ring extending around an exterior surface of the rotor body and defining a radially outer surface, a radially inner surface, and a top surface, wherein the radially inner surface inclines from the top surface and at an angle relative to an axis of rotation of the rotor body to intersect the radially outer surface; and a first elongate reinforcement extending around at least one exterior surface of the rotor body and at least one exterior surface of the pressure ring along a first path.

28. The fixed angle centrifuge rotor of claim 27, further comprising:

a second elongate reinforcement extending around an exterior surface of the first elongate reinforcement along a second path.

29. The fixed angle centrifuge rotor of claim 28, wherein the first path is circular and wherein the second path is helical.

30. The fixed angle centrifuge rotor of claim 27, wherein the pressure ring is constructed of at least one of a metallic material or a ceramic material.

31. A method of manufacturing a fixed angle centrifuge rotor, comprising:

providing a rotor body including a plurality of tubular cavities, each cavity being configured to receive a sample container therein;

positioning a plurality of cell cups within the plurality of cavities, each of the cell cups being received within a respective one of the cavities;

providing a pressure plate;

positioning the rotor body over the pressure plate;

positioning a pressure ring over the rotor body;

applying a first reinforcement to at least the rotor body, the pressure plate, and the pressure ring; and applying a second reinforcement to at least the pressure plate and the first reinforcement.

* * * * *